US012694753B2

(12) United States Patent
Mcintosh et al.

(10) Patent No.: US 12,694,753 B2
(45) Date of Patent: Jul. 28, 2026

(54) CASINO SPLASH ZONES

(71) Applicant: IGT, Las Vegas, NV (US)

(72) Inventors: Jeffery Mcintosh, Dieppe (CA); Ryan Mackenzie, Dieppe (CA); Dwayne Nelson, Las Vegas, NV (US)

(73) Assignee: IGT, Las Vegas, NV (US)

( * ) Notice: Subject to any disclaimer, the term of this patent is extended or adjusted under 35 U.S.C. 154(b) by 153 days.

(21) Appl. No.: 18/226,859

(22) Filed: Jul. 27, 2023

(65) Prior Publication Data

US 2025/0037540 A1 Jan. 30, 2025

(51) Int. Cl.
*G07F 17/00* (2006.01)
*G07F 17/32* (2006.01)

(52) U.S. Cl.
CPC ........ *G07F 17/323* (2013.01); *G07F 17/3211* (2013.01); *G07F 17/3223* (2013.01)

(58) Field of Classification Search
None
See application file for complete search history.

(56) References Cited

U.S. PATENT DOCUMENTS 5,772,509 A * 6/1998 Weiss ...................... G07F 17/32 463/16
5,876,284 A * 3/1999 Acres ...................... G07F 17/32 463/30
6,033,307 A * 3/2000 Vancura .................. G07F 17/32 273/138.2
6,059,289 A * 5/2000 Vancura .................. G07F 17/34 463/20
8,147,334 B2 4/2012 Gatto et al.
8,616,981 B1 * 12/2013 Guinn ...................... G07F 17/34 463/31
8,764,566 B2 7/2014 Miltenberger et al.
8,827,160 B1 * 9/2014 Pascal ................ G06Q 30/0267 235/462.01
9,520,014 B1 * 12/2016 Moshier .................. G07F 17/32
10,540,848 B2 * 1/2020 Kukita ................ G07F 17/3251
10,639,529 B1 * 5/2020 Luciano, Jr. ........... A63B 60/46
11,158,170 B2 * 10/2021 Thomas .............. G07F 17/3248
12,087,134 B2 * 9/2024 Loos ................... G07F 17/3267
2001/0036857 A1 * 11/2001 Mothwurf ............. G07F 17/323 463/25
2003/0078091 A1 * 4/2003 Brandstetter ....... G07F 17/3211 463/20
2003/0125107 A1 * 7/2003 Cannon ............... G07F 17/3244 463/25
2005/0130732 A1 * 6/2005 Rothschild ............. G07F 17/32 463/20
2005/0148380 A1 * 7/2005 Cannon ............... G07F 17/3211 463/16

(Continued)

*Primary Examiner* — Paul A D'Agostino
(74) *Attorney, Agent, or Firm* — Sheridan Ross P.C.

(57) ABSTRACT

Embodiments of the present disclosure describe a splash zone in a casino or other venue. The splash zone is visually similar to the splash zone in an amusement ride. People in the splash zone get wet at the ride. In the present disclosure, people in the splash zone can receive money or prizes. A splash zone can be triggered around a winning gaming system. This can be a monetary event as well as a visual effect. The visual aspects of the winning effect can synchronize lights, animations, and/or sounds across gaming systems.

9 Claims, 6 Drawing Sheets

(56) References Cited

U.S. PATENT DOCUMENTS

| | | | | |
|---|---|---|---|---|
| 2005/0269774 | A1* | 12/2005 | Sorge | A63F 1/00 273/274 |
| 2006/0166731 | A1* | 7/2006 | Yoshimi | G07F 17/3267 463/20 |
| 2006/0166733 | A1* | 7/2006 | Hettinger | G07F 17/32 463/25 |
| 2008/0039194 | A1* | 2/2008 | Walther | G07F 17/32 463/25 |
| 2010/0041464 | A1* | 2/2010 | Arezina | G07F 17/32 463/25 |
| 2011/0244935 | A1* | 10/2011 | Matthews | G07F 17/3295 463/9 |
| 2012/0088576 | A1* | 4/2012 | Shepherd | G07F 17/3258 463/26 |
| 2012/0122529 | A1* | 5/2012 | Lyons | G07F 17/3244 463/1 |
| 2012/0214568 | A1* | 8/2012 | Herrmann | H04L 67/52 463/16 |
| 2012/0244929 | A1* | 9/2012 | Oakes | G07F 17/32 707/741 |
| 2013/0035149 | A1* | 2/2013 | Oakes | G07F 17/329 463/17 |
| 2014/0066181 | A1* | 3/2014 | Fong | G07F 17/3211 463/25 |
| 2014/0378204 | A1* | 12/2014 | Michel | G07F 17/329 463/17 |
| 2015/0310700 | A1* | 10/2015 | Arnone | G07F 17/326 463/16 |
| 2015/0310703 | A1* | 10/2015 | Katz | G07F 17/3244 463/25 |
| 2015/0371488 | A1* | 12/2015 | Watkins | G07F 17/326 463/20 |
| 2017/0116824 | A1* | 4/2017 | Katz | G07F 17/3244 |
| 2017/0278350 | A1* | 9/2017 | Kukita | A63F 13/30 |
| 2018/0025580 | A1* | 1/2018 | Rader | G07F 17/3255 463/16 |
| 2018/0326283 | A1* | 11/2018 | Sexton | A63B 69/32 |
| 2019/0287342 | A1* | 9/2019 | Rader | G07F 17/3255 |
| 2020/0111301 | A1* | 4/2020 | Wasinger | G07F 17/3267 |
| 2021/0097815 | A1* | 4/2021 | Thomas | G07F 17/3213 |
| 2021/0097816 | A1* | 4/2021 | Burns | G07F 17/3237 |
| 2021/0319656 | A1* | 10/2021 | Vasquez | G07F 17/3239 |
| 2022/0172564 | A1* | 6/2022 | Loos | G07F 17/3267 |

* cited by examiner

CASINO SPLASH ZONES

BACKGROUND

The present disclosure is generally directed to electronic gaming and, more specifically, to a splash zone effect across multiple gaming systems in a gaming venue when a win occurs on one or the gaming systems.

In a casino environment, games which provide a sense of excitement can increase player engagement. Increased player engagement in turns leads to increased use of the game and revenues for the operator of the casino. Thus, there is a need to provide a sense of excitement or increased chances to win through a game.

BRIEF SUMMARY

Embodiments of the present disclosure are directed to increasing player engagement with the electronic game through the use of a splash zone effect across multiple gaming systems in a venue when a win occurs on one or the gaming systems. According to one embodiment, a host system of a venue can comprise a communications interface coupled with a communications network, a processor coupled with the communications interface, and a memory coupled with and readable by the memory. The memory can have stored therein a set of instructions which, when executed by the processor, causes the processor to receive, via the communications interface, from a first gaming system in the venue, an electronic message indicating an occurrence of a win event in an electronic game executing on the first gaming system and determine, based on the received electronic message, whether the win event in the electronic game executing on the first gaming system qualifies as a zone win event. Determining whether the win event in the electronic game executing on the first gaming system qualifies as a zone win event can be based on a win type for the win event, a theme for the electronic game, a time of day, whether the first gaming system is one or a predefined plurality of gaming systems, and/or other factors.

In response to determining the win event in the electronic game executing on the first gaming system qualifies as a zone win, the instructions can further cause the processor to determine a physical area within the venue for the zone win event. Determining the physical area within the venue for the zone win event can be based on an award size associated with the win event in the electronic game executing on the first gaming system, a win type for the win event in the electronic game executing on the first gaming system, a size of a wager made in the electronic game executing on the first gaming system, and/or other factors.

The instructions can further cause the processor to send, via the communications interface, to a second gaming system within the determined physical area within the venue, an electronic message including an instruction for awarding a zone win. In some cases, the instructions can further cause the processor to determine whether the second gaming system is eligible to receive the zone win event. In such cases, sending the electronic message including the instruction for awarding the zone win can be performed in response to determining the second gaming system is eligible to receive the zone win event.

According to another embodiment, a method for operating a plurality of gaming systems can comprise executing, by a first gaming system of the plurality of gaming systems, an electronic game, detecting, by the first gaming system, an occurrence of a win event in the electronic game, and sending, by the first gaming system, an electronic message to a host system, the electronic message indicating the detected occurrence of the win event. A second gaming system of the plurality of gaming systems can receive an electronic message from the host system. The electronic message from the host system can comprise an instruction for awarding a zone win based on the occurrence of the win event in the electronic game executing on the first gaming system. The zone win can comprise, for example, a monetary award to a player of the second gaming system.

An element of the second gaming system can be updated based on the instruction for awarding the zone win. For example, updating the element of the second gaming system can comprise presenting a graphical indication of the zone win on a display device of the second gaming system. Additionally, or alternatively, updating the element of the second gaming system comprises updating a credit meter of the second gaming system. Updating the element of the second gaming system can additionally, or alternatively, comprise providing an indication of a prize award in a user interface presented on a display device of the second gaming system.

According to yet another embodiment, a method for operating a plurality of gaming systems in a venue can comprise executing, by a first gaming system of the plurality of gaming systems, an electronic game. The first gaming system can detect an occurrence of a win event in the electronic game and send an electronic message to a host system of the venue. The electronic message can indicate the detected occurrence of the win event.

The host system can receive, from the first gaming system, the electronic message indicating the occurrence of the win event in the electronic game executing on the first gaming system and determine, based on the received electronic message, whether the win event in the electronic game executing on the first gaming system qualifies as a zone win event. In response to determining the win event in the electronic game executing on the first gaming system qualifies as a zone win event, the host system can determine a physical area within the venue for the zone win event and send, to a second gaming system of the plurality of gaming systems and within the determined physical area within the venue, an electronic message including an instruction for awarding a zone win. Determining the physical area within the venue for the zone win event is based on a win type for the win event, an award amount for the win event, an amount of a wager made in the electronic game executing on the first gaming system, and/or other factors. In some cases, the host system can further determine whether the second gaming system is eligible for the zone win. In such cases, sending the electronic message including the instruction for awarding the zone win can be performed in response to determining the second gaming system is eligible for the zone win.

The second gaming system can receive the electronic message from the host system and update an element of the second gaming system based on the instruction for awarding the zone win. In some cases, the second gaming system can comprise a mobile device.

Additional features and advantages are described herein and will be apparent from the following Description and the figures.

DETAILED DESCRIPTION

Embodiments of the present disclosure describe a splash zone in a casino or other gaming venue. The splash zone is visually similar to the splash zone in an amusement ride. People in the splash zone get wet at the ride. In the present disclosure, people in the splash zone can receive money or prizes. A splash zone can be triggered around a winning gaming system. This can be a monetary event as well as a visual effect. The visual aspects of the winning effect can synchronize lights, animations, and/or sounds across gaming systems.

Figure 1:
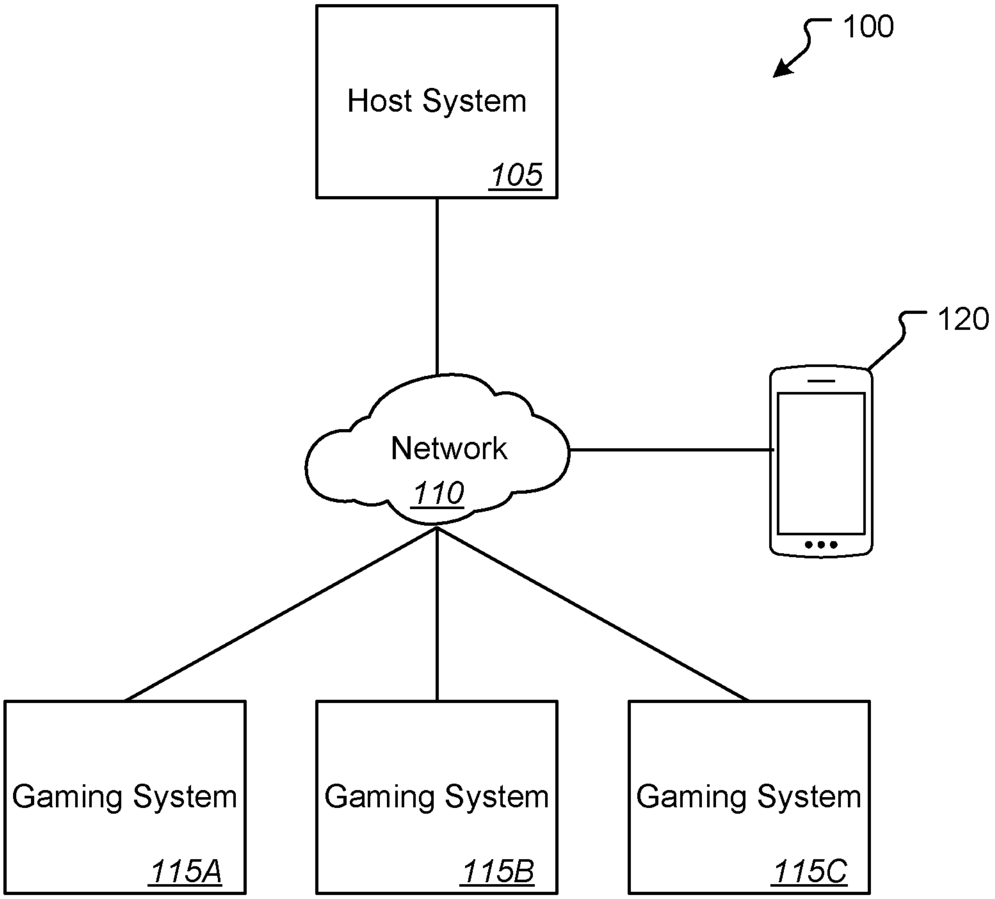
FIG. 1 is a block diagram illustrating an exemplary gaming venue environment in which embodiments of the present disclosure can be implemented.

FIG. 1 is a block diagram illustrating an exemplary gaming venue environment in which embodiments of the present disclosure can be implemented. As illustrated in this example, the gaming venue environment 100 can comprise a gaming host system 105 communicatively coupled with a communications network 110. The host system 105 can comprise any one or more servers and/or other computing systems. The communications network 110 can comprise any one or more wired and/or wireless local and/or wide areas networks. Also coupled with the communications network 110 can be any number of gaming systems 115A-115C. Any one or more of the gaming systems 115A-115C can execute an electronic game including, by not limited do, slots, video poker, video keno, etc. The gaming systems 115A-115C can be arranged in a row or "bank" within the gaming venue. In some cases, the gaming systems 115A-115C can be arranged in multiple dimension, i.e., several or many gaming systems wide and deep.

According to one embodiment, one of the gaming system 115B may trigger a win, such as a progressive win. The win on that gaming system 115B can create a splash zone around the winning gaming systems 115B and affect the gaming systems 115A and 115C on either side of the winning gaming system 115B. The splash zone can spread or "splash" some of the win across the adjacent gaming systems 115A and 115C in the splash zone such that the gaming systems 115A and 115C in the zone win some type of prize such as money, player points or virtual points. The monetary event can be accompanied by a graphical presentation indicating there is a splash zone, the size of the splash zone, the gaming systems 115A and 115C affected by the splash zone and the effect of the splash zone. As a simple example of the award mechanism, the winning gaming system 115B might have hit a progressive for $1250. The two immediate adjacent gaming systems 115A and 115C next to the winning gaming system 115B might be awarded $20 each. The next two distant gaming systems (not shown here) from the winning gaming system 115B might be awarded $5 each. This effectively is awarding the winning player $1250 and the splash zone recipients a total of $50 (20+20+5+5).

In one embodiment the gaming systems 115A and 115C can display the benefit of the splash zone on the screen. For example, the gaming systems 115A and 115C in the zone might display "Splash Zone: $5.00". In one embodiment an overhead sign (not shown here) might indicate there is a splash zone on the bank and might indicate which gaming systems are affected.

In one embodiment, the amount of the splash zone can be fixed across the recipients. In another embodiment, the amount of the splash zone can be different per gaming system and may be proportional to the distance from the winning gaming system 115B. In another embodiment, the amount of the splash zone can be some random value. In yet another embodiment, the amount of the splash zone can be proportional to the play or win of the person at the gaming system.

In one example, the splash amount can be proportional to the amount the player has won or wagered (as previously mentioned). For example, a person wagering $1 in the splash zone would receive four times as much as a person wagering 25 cents in the splash zone when both players are the same distance from the triggering gaming system 115B.

The host system 105 can have a map of the gaming venue floor that indicates the location of the gaming systems 115A-115C. This could be a static map or the host system might create a map of the floor dynamically using triangulation and wireless emitters in each gaming system 115A-115C. In this way, the host system 105 can know the location of each gaming system 115A-115C on the floor in order to determine the gaming systems that are in the splash zone.

More specifically, wins can be reported to the host system 105 from the gaming systems, e.g., using a protocol such as G2S or using a Slot Machine Interface Board (SMIB) to communicate with the host system 105. Once the host system 105 is notified of the win, it can determine if the win qualifies for a splash zone event. The determination of when to trigger a splash zone could be based on any one or more of a certain progressive win, a certain game event win, a certain theme, a certain sets of gaming systems, a certain time of day, a certain amount of play of the machines, operator selection of the next win, etc.

Once the host system 105 has determined the win is a splash zone event, the next step is to determine the radius of the zone. Radius should be considered a broad concept as the gaming systems affected might not be in an exact circle. The affected area could be a square or any irregular shape. The radius or physical area of the event could be determined based on any one or more of the monetary size of the winning event, the size of the current splash zone prize pool, the type of progressive win (minor or major prize), the denomination or wager of the winning event, the player status of the winner of the winning event, gold vs silver player loyalty member, a random value, etc.

Once the physical area is determined the eligible gaming systems in the physical area can be determined. In one embodiment eligibility could be gaming systems that are being played. Additionally, or alternatively, eligibility can be determined based on any one or more of the player at the gaming system playing a certain amount of money or time, the player at the gaming system being a carded player, the player at the gaming system being a loyalty member of a certain level, all gaming systems even if they aren't being played, players playing a certain game theme, players wagering a certain amount over a certain period of time, some random parameter, etc. In one embodiment, where gaming systems that are not occupied are targeted, the next player to insert money or tickets or login into the gaming system can be awarded the prize. In one embodiment, the prize can remain on the gaming system awaiting a player for a certain amount of time such as 5 minutes.

The award for the splash zone could be money, player points, virtual points, or some physical prize such as a free meal or other casino service. The source of a monetary award could be the winning progressive, i.e., some of the win for the splash could come from the win itself, or a hidden level of the progressive controller. In another example, all gaming systems can be contributing to the progressive levels and one or more of those levels could be hidden. These can be levels that the players cannot see but are on the progressive controller. In yet another example, the gaming venue operator could contribute $100, as an example, to the splash zone. The money could be in the form of player credits, promotional credits or non-cashable credits.

The host system 105 can then determine the individual prize per gaming system/player in the physical area. The individual prize amounts could be determined by any one or more of the distance from the winning gaming system, scaled by the players win amount over a period of time, scaled by the player wager amount over a period of time, all equal amounts, random, etc. The amount of the prize could be based on being carded or having a certain player club level. For example, only carded players win money or win more money.

Once the prize per gaming system or player is determined the amount can be transferred. In one embodiment the prize can be transferred to the player's wagering account. In one embodiment, the prize amount is transferred to the player's gaming system. As described above, it is possible that the splash zone awards an empty gaming system and therefore provides the prize to the next player that uses the gaming system. Other variations could include sending the transfer amount to the gaming system and then waiting for the player to cash in, log in, or otherwise occupy the gaming system before transferring the money to the player balance ("CREDIT METER").

In another embodiment, the splash zone can include mobile devices 120 of players or customers. If a person's mobile device 120 is executing a mobile application for the gaming venue and is in the splash zone, the user can receive some benefit including money, points, achievements, status, a service etc. In one embodiment, the person using the mobile application can be engaging in some mobile wagering or mobile sports betting to qualify while in another embodiment, no activity is required to win the splash zone benefit(s) from the mobile application. Indoor triangulation of mobile devices 120 can be used to determine the position of the mobile device. Methods are available using beacons or other wireless devices that use signal strength or signal delays to pinpoint the location of the mobile device 120. This allows the mobile application to know its position inside a gaming venue. It is also possible for the host system 105 to know the location of the mobile device 120 using this technology. Other methods for determining the position of the mobile device 120 include analyzing video camera images.

Figure 2:
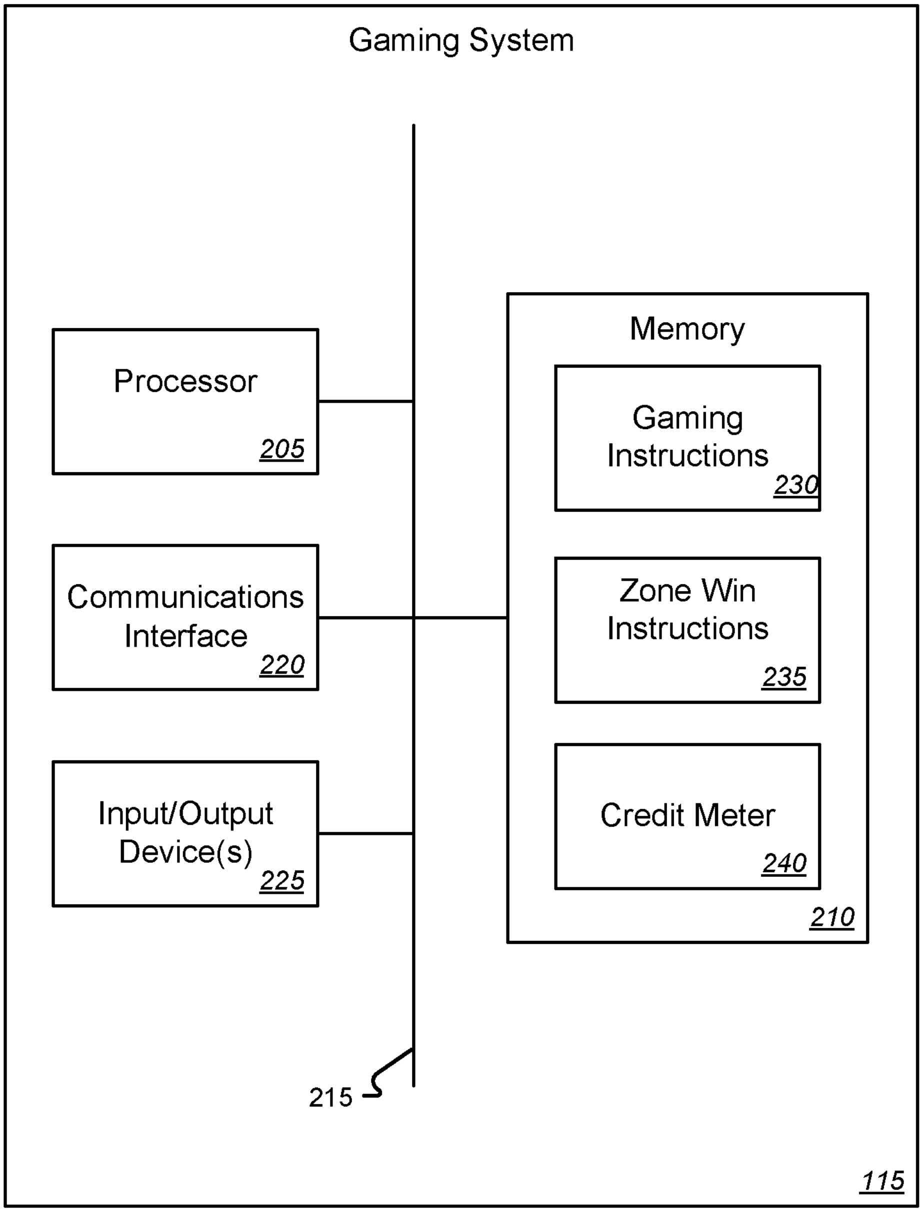
FIG. 2 is a block diagram illustrating additional details of components of an exemplary gaming system in which zone wins can be implemented according to one embodiment of the present disclosure.

FIG. 2 is a block diagram illustrating additional details of components of an exemplary gaming system in which zone wins can be implemented according to one embodiment of the present disclosure. As illustrated in this example, a gaming system 115 can comprise a processor 205. The processor 205 may correspond to one or many computer processing devices. For instance, the processor 205 may be provided as silicon, as a Field Programmable Gate Array (FPGA), an Application-Specific Integrated Circuit (ASIC), any other type of Integrated Circuit (IC) chip, a collection of IC chips, or the like. As a more specific example, the processor 205 may be provided as a microprocessor, Central Processing Unit (CPU), or plurality of microprocessors that are configured to execute the instructions sets stored in a memory 210. Upon executing the instruction sets stored in memory 210, the processor 205 enables various functions of the gaming system 115 as described herein.

The memory 210 can be coupled with and readable by the processor 205 via a communications bus 215. The memory 210 may include any type of computer memory device or collection of computer memory devices. Non-limiting examples of memory 210 include Random Access Memory (RAM), Read Only Memory (ROM), flash memory, Electronically-Erasable Programmable ROM (EEPROM), Dynamic RAM (DRAM), etc. The memory 210 may be configured to store the instruction sets depicted in addition to temporarily storing data for the processor 205 to execute various types of routines or functions.

The processor 205 can also be coupled with one or more communication interfaces 220 and one or more input/output devices 225 via the communications bus 215. The communication interfaces 215 can comprise, for example, a Bluetooth, WiFi, cellular, and/or other type of wireless communications interface. The input/output devices can include, but are not limited to a display device such as a Liquid Crystal Display (LCD), Light Emitting Diode (LED), Organic Light Emitting Diode (OLED), or other type of display.

The memory 210 can store therein a set of gaming instructions 230 which, when executed by the processor 205, cause the processor 205 to execute an electronic game. The memory can also store therein a set of zone win instructions 235 which, when executed by the processor 205, causes the processor 205 to participate in a zone win event as described herein. For example, during execution of the electronic game, the zone win instructions 235 can cause the processor to detect an occurrence of a win event in the electronic game and send an electronic message to the host system 105 via the communications interface 220. The electronic message can indicate the detected occurrence of the win event and information related to the win event.

In other cases, the zone win instructions 235 can cause the processor 205 to receive an electronic message from the host system 105 via the communications interface 220. The electronic message from the host system 105 can comprise an instruction for awarding a zone win based on the occurrence of the win event in the electronic game executing on another gaming system 115. The zone win instructions 235 can then cause the processor 205 to update an element of the gaming system 115 based on the instruction for awarding the zone win. Updating the element of the gaming system 115 can comprise presenting a graphical indication of the zone win on an input/output device 225 such as a display device, updating a credit meter 240 of the gaming system 115A, providing an indication of a prize award in a user interface presented on a display device of the gaming system 115, etc.

Figure 3:
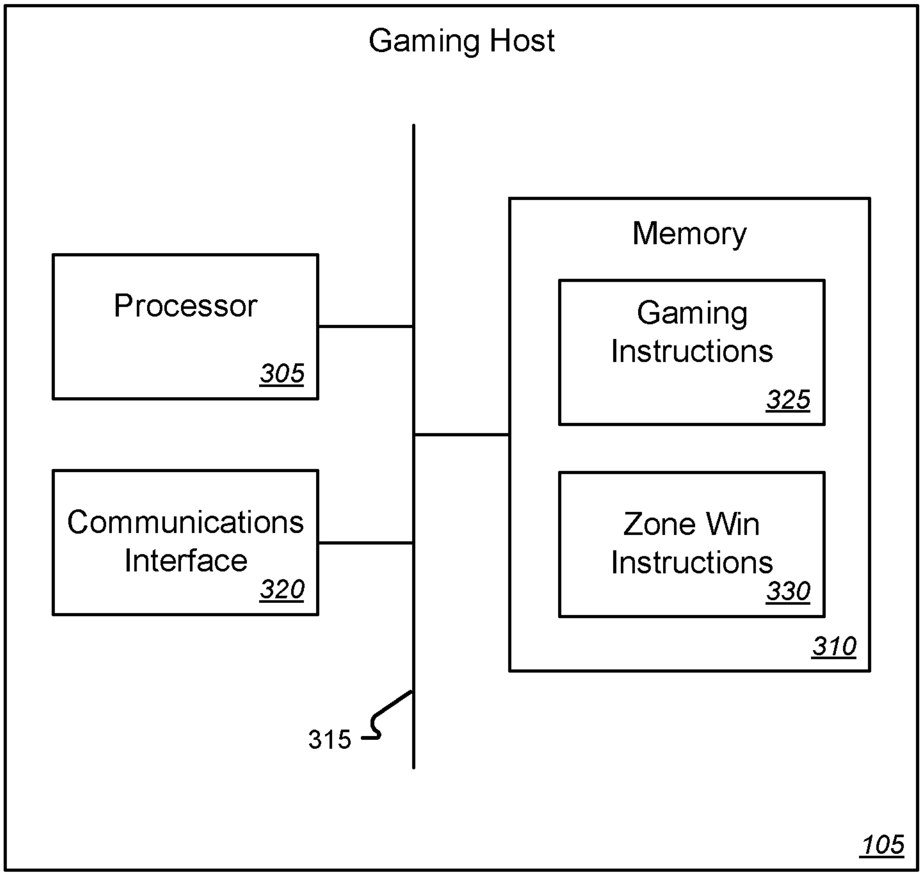
FIG. 3 is a block diagram illustrating additional details of components of an exemplary gaming venue host system for implementing zone wins according to one embodiment of the present disclosure.

FIG. 3 is a block diagram illustrating additional details of components of an exemplary gaming venue host system for implementing zone wins according to one embodiment of the present disclosure. As illustrated in this example, the gaming host 105 can comprise a processor 305 such as any of the various types of processors described above. A memory 310 can be coupled with and readable by the processor 305 via a communications bus 315. The memory 310 can comprise any one or more of the different types of volatile and/or non-volatile memories described above. The processor 305 can also be coupled with one or more communication interfaces 320 via the communications bus 315. The communication interfaces 320 can comprise, for example, Ethernet, Bluetooth, WiFi, or other type of wired or wireless communications interfaces.

The memory 310 can store therein a set of gaming instructions 325 which, when executed by the processor 305, cause the processor 305 to receive, through the communications interface 320, and monitor ongoing gaming activity of the gaming systems 115A-115C. The memory can also have stored therein a set of zone win instructions 330 which, when executed by the processor 305, can cause the processor 305 to receive an electronic message indicating an occurrence of a win event in an electronic game executing on a gaming system 115B and determine, based on the received electronic message, whether the win event in the electronic game executing on the gaming system 115B qualifies as a zone win event. In response to determining the win event in the electronic game executing on the gaming system 115B qualifies as a zone win, the zone win instructions 330 can cause the processor 305 to determine a physical area within the gaming venue for the zone win, identify one or more other gaming systems 115A and 115C within the determined physical area of the gaming venue, and determine whether the other gaming system(s) 115A and 115C is/are eligible to receive the zone win event. In response to determining a gaming system is eligible, the zone win instructions cause then cause the processor 305 to send an electronic message including an instruction for awarding a zone win to the eligible one or more second gaming systems 115A and 115C within the determined physical area within the gaming venue.

Figure 4:
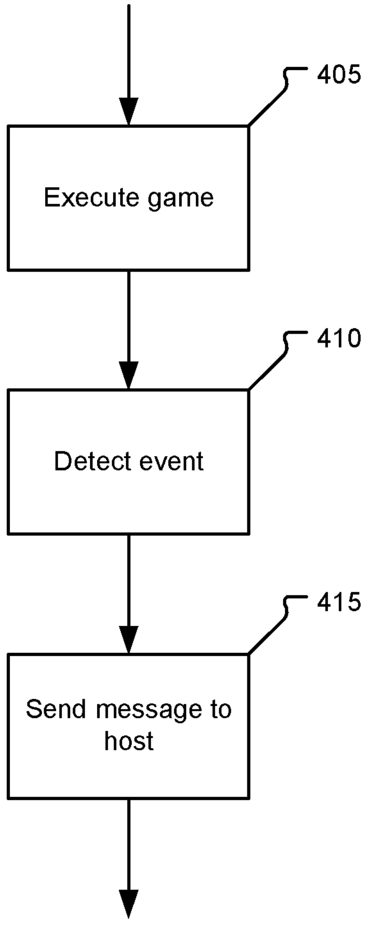
FIG. 4 is a flowchart illustrating an exemplary process for managing execution in a gaming system according to one embodiment of the present disclosure.

FIG. 4 is a flowchart illustrating an exemplary process for managing execution in a gaming system according to one embodiment of the present disclosure. More specifically, this example illustrates a process as may be performed by a gaming system 115B on which a win event occurs. As illustrated in this example, the process can begin with executing 405 an electronic game. During execution 405 of the electronic game, an occurrence of a win event in the electronic game can be detected 410. In response to detecting 410 the occurrence of the win event, an electronic message can be sent to the host system 105. The electronic message can indicate the detected occurrence of the win event and information related to the win event. For example, the information related to the win event can indicate the win amount or reward, an amount of a wager made in the electronic game resulting in the win event, an amount of time played before the win event, etc.

Figure 5:
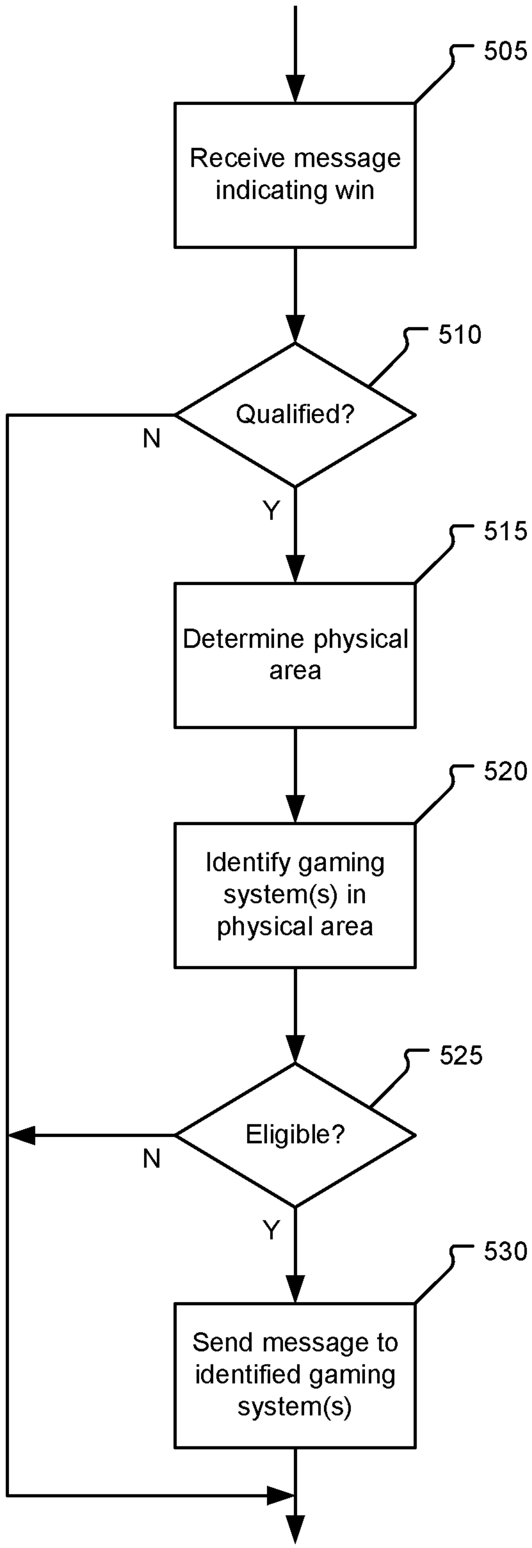
FIG. 5 is a flowchart illustrating an exemplary process for implementing zone wins according to one embodiment of the present disclosure.

FIG. 5 is a flowchart illustrating an exemplary process for implementing zone wins according to one embodiment of the present disclosure. More specifically, this example illustrates processes as may be performed by the host system 105 as described above. As illustrated in this example, the process can begin with receiving 505, from a first gaming system 115B in a gaming venue, an electronic message indicating an occurrence of a win event in an electronic game executing on the first gaming system 115B. A determination 510 can be made based on the received electronic message as to whether the win event in the electronic game executing on the first gaming system 115B qualifies as a zone win event. Determining 510 whether the win event in the electronic game executing on the first gaming system 115B qualifies as a zone win event can be based on a win type for the win event. Additionally, or alternatively, determining 510 whether the win event in the electronic game executing on the first gaming system 115B qualifies as a zone win event can be based on a theme for the electronic game. Determining 510 whether the win event in the electronic game executing on the first gaming system 115B qualifies as a zone win event can additionally, or alternatively, be based on whether the first gaming system 115B is one or a predefined plurality of gaming systems 115A-115C. Additionally, or alternatively, determining 510 whether the win event in the electronic game executing on the first gaming system 115B qualifies as a zone win event can be based on a time of day.

In response to determining 510 the win event in the electronic game executing on the first gaming system 115B qualifies as a zone win, a physical area within the gaming venue for the zone win can be determined 515. Determining 515 the physical area within the gaming venue for the zone win event can be based on an award size associated with the win event in the electronic game executing on the first gaming system 115B. Additionally, or alternatively, determining 515 the physical area within the gaming venue for the zone win event can be based on a win type for the win event in the electronic game executing on the first gaming system 115B. Determining 515 the physical area within the gaming venue for the zone win event can additionally, or alternatively, be based on a size of a wager made in the electronic game executing on the first gaming system 115B.

One or more second gaming systems 115A and 115C within the determined 515 physical area of the gaming venue can be identified 520 and a determination 525 can be made as to whether the second gaming system(s) 115A and 115C is/are eligible to receive the zone win event. Eligibility can be determined 525 by one or more of: the gaming system being played; the player at the gaming system playing a certain amount of money or time; the player at the gaming system being a carded player; the player at the gaming system being a loyalty member of a certain level, all gaming system s even if they aren't being played; players playing a certain game theme; players wagering a certain amount over a certain period of time; some random parameter; and/or other factors. In response to determining 525 a gaming system is eligible, an electronic message including an instruction for awarding a zone win can be sent 530 to the eligible one or more second gaming systems 115A and 115C within the determined physical area within the gaming venue.

Figure 6:
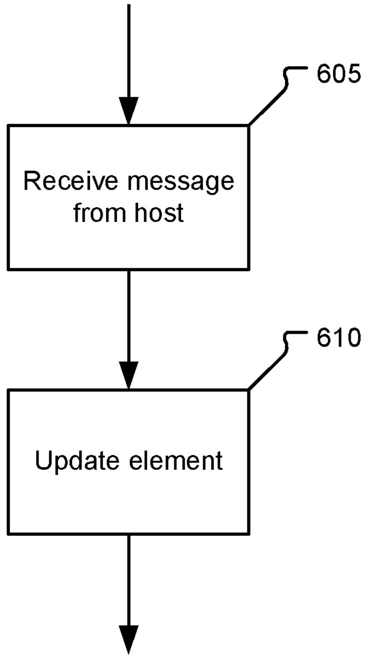
FIG. 6 is a flowchart illustrating an exemplary process for implementing a zone win in a gaming system according to one embodiment of the present disclosure.

FIG. 6 is a flowchart illustrating an exemplary process for implementing a zone win in a gaming system according to one embodiment of the present disclosure. More specifically, this example illustrates a process as may be executed by one or more second gaming systems 115A and 115C being awarded a zone win. As illustrated in this example, the process can begin with receiving 605 an electronic message from the host system 105. The electronic message from the host system 105 can comprise an instruction for awarding a zone win based on the occurrence of the win event in the electronic game executing on the first gaming system 115B. An element of the second gaming system(s) 115A and 115C can be updated 610 based on the instruction for awarding the zone win. Updating 610 the element of the second gaming system(s) 115A and 115C can comprise presenting a graphical indication of the zone win on a display device of the second gaming system(s) 115A and 115C. Additionally, or alternatively, updating 610 the element of the second gaming system(s) 115A and 115C can comprise updating a credit meter of the second gaming system(s) 115A and 115C. Updating 610 the element of the second gaming system(s) 115A and 115C can additionally, or alternatively, comprise providing an indication of a prize award in a user interface presented on a display device of the second gaming system(s) 115A and 115C.

A number of variations and modifications of the disclosure can be used. It would be possible to provide for some features of the disclosure without providing others.

The present disclosure contemplates a variety of different gaming systems each having one or more of a plurality of different features, attributes, or characteristics. A "gaming system" as used herein refers to various configurations of: (a) one or more central servers, central controllers, or remote hosts; (b) one or more electronic gaming machines such as those located on a casino floor; and/or (c) one or more personal gaming devices, such as desktop computers, laptop computers, tablet computers or computing devices, personal digital assistants, mobile phones, and other mobile computing devices. Moreover, an EGM as used herein refers to any suitable electronic gaming machine which enables a player to play a game (including but not limited to a game of chance, a game of skill, and/or a game of partial skill) to potentially win one or more awards, wherein the EGM comprises, but is not limited to: a slot machine, a video poker machine, a video lottery terminal, a terminal associated with an electronic table game, a video keno machine, a video bingo machine located on a casino floor, a sports betting terminal, or a kiosk, such as a sports betting kiosk.

In various embodiments, the gaming system of the present disclosure includes: (a) one or more electronic gaming machines in combination with one or more central servers, central controllers, or remote hosts; (b) one or more personal gaming devices in combination with one or more central servers, central controllers, or remote hosts; (c) one or more personal gaming devices in combination with one or more electronic gaming machines; (d) one or more personal gaming devices, one or more electronic gaming machines, and one or more central servers, central controllers, or remote hosts in combination with one another; (e) a single electronic gaming machine; (f) a plurality of electronic gaming machines in combination with one another; (g) a single personal gaming device; (h) a plurality of personal gaming devices in combination with one another; (i) a single central server, central controller, or remote host; and/or (j) a plurality of central servers, central controllers, or remote hosts in combination with one another.

For brevity and clarity and unless specifically stated otherwise, "EGM" as used herein represents one EGM or a plurality of EGMs, "personal gaming device" as used herein represents one personal gaming device or a plurality of personal gaming devices, and "central server, central controller, or remote host" as used herein represents one central server, central controller, or remote host or a plurality of central servers, central controllers, or remote hosts.

As noted above, in various embodiments, the gaming system includes an EGM (or personal gaming device) in combination with a central server, central controller, or remote host. In such embodiments, the EGM (or personal gaming device) is configured to communicate with the central server, central controller, or remote host through a data network or remote communication link. In certain such embodiments, the EGM (or personal gaming device) is configured to communicate with another EGM (or personal gaming device) through the same data network or remote communication link or through a different data network or remote communication link. For example, the gaming system includes a plurality of EGMs that are each configured to communicate with a central server, central controller, or remote host through a data network.

In certain embodiments in which the gaming system includes an EGM (or personal gaming device) in combination with a central server, central controller, or remote host, the central server, central controller, or remote host is any suitable computing device (such as a server) that includes at least one processor and at least one memory device or data storage device. As further described herein, the EGM (or personal gaming device) includes at least one EGM (or personal gaming device) processor configured to transmit and receive data or signals representing events, messages, commands, or any other suitable information between the EGM (or personal gaming device) and the central server, central controller, or remote host. The at least one processor of that EGM (or personal gaming device) is configured to execute the events, messages, or commands represented by such data or signals in conjunction with the operation of the EGM (or personal gaming device). Moreover, the at least one processor of the central server, central controller, or remote host is configured to transmit and receive data or signals representing events, messages, commands, or any other suitable information between the central server, central controller, or remote host and the EGM (or personal gaming device). The at least one processor of the central server, central controller, or remote host is configured to execute the events, messages, or commands represented by such data or signals in conjunction with the operation of the central server, central controller, or remote host. One, more than one, or each of the functions of the central server, central controller, or remote host may be performed by the at least one processor of the EGM (or personal gaming device). Further, one, more than one, or each of the functions of the at least one processor of the EGM (or personal gaming device) may be performed by the at least one processor of the central server, central controller, or remote host.

In certain such embodiments, computerized instructions for controlling any games (such as any primary or base games and/or any secondary or bonus games) displayed by the EGM (or personal gaming device) are executed by the central server, central controller, or remote host. In such "thin client" embodiments, the central server, central controller, or remote host remotely controls any games (or other suitable interfaces) displayed by the EGM (or personal gaming device), and the EGM (or personal gaming device) is utilized to display such games (or suitable interfaces) and to receive one or more inputs or commands. In other such embodiments, computerized instructions for controlling any games displayed by the EGM (or personal gaming device) are communicated from the central server, central controller, or remote host to the EGM (or personal gaming device) and are stored in at least one memory device of the EGM (or personal gaming device). In such "thick client" embodiments, the at least one processor of the EGM (or personal gaming device) executes the computerized instructions to control any games (or other suitable interfaces) displayed by the EGM (or personal gaming device).

In various embodiments in which the gaming system includes a plurality of EGMs (or personal gaming devices), one or more of the EGMs (or personal gaming devices) are thin client EGMs (or personal gaming devices) and one or more of the EGMs (or personal gaming devices) are thick client EGMs (or personal gaming devices). In other embodiments in which the gaming system includes one or more EGMs (or personal gaming devices), certain functions of one or more of the EGMs (or personal gaming devices) are implemented in a thin client environment, and certain other functions of one or more of the EGMs (or personal gaming devices) are implemented in a thick client environment. In one such embodiment in which the gaming system includes an EGM (or personal gaming device) and a central server, central controller, or remote host, computerized instructions for controlling any primary or base games displayed by the EGM (or personal gaming device) are communicated from the central server, central controller, or remote host to the EGM (or personal gaming device) in a thick client configuration, and computerized instructions for controlling any secondary or bonus games or other functions displayed by the EGM (or personal gaming device) are executed by the central server, central controller, or remote host in a thin client configuration.

In certain embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a local area network (LAN) in which the EGMs (or personal gaming devices) are located substantially proximate to one another and/or the central server, central controller, or remote host. In one example, the EGMs (or personal gaming devices) and the central server, central controller, or remote host are located in a gaming establishment or a portion of a gaming establishment.

In other embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include a wide area network (WAN) in which one or more of the EGMs (or personal gaming devices) are not necessarily located substantially proximate to another one of the EGMs (or personal gaming devices) and/or the central server, central controller, or remote host. For example, one or more of the EGMs (or personal gaming devices) are located: (a) in an area of a gaming establishment different from an area of the gaming establishment in which the central server, central controller, or remote host is located; or (b) in a gaming establishment different from the gaming establishment in which the central server, central controller, or remote host is located. In another example, the central server, central controller, or remote host is not located within a gaming establishment in which the EGMs (or personal gaming devices) are located. In certain embodiments in which the communication network includes a WAN, the gaming system includes a central server, central controller, or remote host and an EGM (or personal gaming device) each located in a different gaming establishment in a same geographic area, such as a same city or a same state. Gaming systems in which the communication network includes a WAN are substantially identical to gaming systems in which the communication network includes a LAN, though the quantity of EGMs (or personal gaming devices) in such gaming systems may vary relative to one another.

In further embodiments in which the gaming system includes: (a) an EGM (or personal gaming device) configured to communicate with a central server, central controller, or remote host through a data network; and/or (b) a plurality of EGMs (or personal gaming devices) configured to communicate with one another through a communication network, the communication network may include an internet (such as the Internet) or an intranet. In certain such embodiments, an Internet browser of the EGM (or personal gaming device) is usable to access an Internet game page from any location where an Internet connection is available. In one such embodiment, after the EGM (or personal gaming device) accesses the Internet game page, the central server, central controller, or remote host identifies a player before enabling that player to place any wagers on any plays of any wagering games. In one example, the central server, central controller, or remote host identifies the player by requiring a player account of the player to be logged into via an input of a unique player name and password combination assigned to the player. The central server, central controller, or remote host may, however, identify the player in any other suitable manner, such as by validating a player tracking identification number associated with the player; by reading a player tracking card or other smart card inserted into a card reader; by validating a unique player identification number associated with the player by the central server, central controller, or remote host; or by identifying the EGM (or personal gaming device), such as by identifying the MAC address or the IP address of the Internet facilitator. In various embodiments, once the central server, central controller, or remote host identifies the player, the central server, central controller, or remote host enables placement of one or more wagers on one or more plays of one or more primary or base games and/or one or more secondary or bonus games, and displays those plays via the Internet browser of the EGM (or personal gaming device). Examples of implementations of Internet-based gaming are further described in U.S. Pat. No. 8,764,566, entitled "Internet Remote Game Server," and U.S. Pat. No. 8,147,334, entitled "Universal Game Server."

The central server, central controller, or remote host and the EGM (or personal gaming device) are configured to connect to the data network or remote communications link in any suitable manner. In various embodiments, such a connection is accomplished via: a conventional phone line or other data transmission line, a digital subscriber line (DSL), a T-1 line, a coaxial cable, a fiber optic cable, a wireless or wired routing device, a mobile communications network connection (such as a cellular network or mobile Internet network), or any other suitable medium. The expansion in the quantity of computing devices and the quantity and speed of Internet connections in recent years increases opportunities for players to use a variety of EGMs (or personal gaming devices) to play games from an ever-increasing quantity of remote sites. Additionally, the enhanced bandwidth of digital wireless communications may render such technology suitable for some or all communications, particularly if such communications are encrypted. Higher data transmission speeds may be useful for enhancing the sophistication and response of the display and interaction with players.

As should be appreciated by one skilled in the art, aspects of the present disclosure have been illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (Saas).

Aspects of the present disclosure have been described herein with reference to flowchart illustrations and/or block diagrams of methods, apparatuses (systems) and computer program products according to embodiments of the disclosure. It should be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

What is claimed is:

1. A host system of a venue, the host system comprising:

a communications interface coupled with a communications network;

a processor coupled with the communications interface; and a memory coupled with and readable by the memory and having stored therein a set of instructions which, when executed by the processor, causes the processor to:

receive, via the communications interface, from a first gaming system in a venue, an electronic message indicating an occurrence of a win event in an electronic game executing on the first gaming system;

determine, based on the received electronic message, whether the win event in the electronic game executing on the first gaming system qualifies as a zone win event;

in response to determining the win event in the electronic game executing on the first gaming system qualifies as a zone win, determine a physical area within the venue for the zone win event, wherein a radius of the physical area is based on information related to the win event; and send, via the communications interface, to a second gaming system within the determined physical area within the venue, an electronic message including an instruction for awarding a zone win, wherein a size of the zone win is based on the information related to the win event and a distance between the first gaming system and the second gaming system.

2. The host system of claim 1, wherein determining whether the win event in the electronic game executing on the first gaming system qualifies as a zone win event is based on a win type for the win event.

3. The host system of claim 1, wherein determining whether the win event in the electronic game executing on the first gaming system qualifies as a zone win event is based on a theme for the electronic game.

4. The host system of claim 1, wherein determining whether the win event in the electronic game executing on the first gaming system qualifies as a zone win event is based on whether the first gaming system is one or a predefined plurality of gaming systems.

5. The host system of claim 1, wherein determining whether the win event in the electronic game executing on the first gaming system qualifies as a zone win event is based on a time of day.

6. The host system of claim 1, wherein determining the physical area within the venue for the zone win event is based on an award size associated with the win event in the electronic game executing on the first gaming system.

7. The host system of claim 1, wherein determining the physical area within the venue for the zone win event is based on a win type for the win event in the electronic game executing on the first gaming system.

8. The host system of claim 1, wherein determining the physical area within the venue for the zone win event is based on a size of a wager made in the electronic game executing on the first gaming system.

9. The host system of claim 1, wherein the instructions further cause the processor to determine whether the second gaming system is eligible to receive the zone win event and wherein sending the electronic message including the instruction for awarding the zone win is performed in response to determining the second gaming system is eligible to receive the zone win event.

* * * * *